United States Patent
Obrist

[11] Patent Number: 6,089,557
[45] Date of Patent: Jul. 18, 2000

[54] CLAMPING DEVICE AND CLAMPING ASSEMBLY FOR CLAMPING WORK PIECES OR TOOLS IN A WELL DEFINED POSITION

[75] Inventor: Basil Obrist, CH-Gontenschwil, Switzerland

[73] Assignee: Certa AG, Reinach, Switzerland

[21] Appl. No.: 08/872,825

[22] Filed: Jun. 11, 1997

[30] Foreign Application Priority Data

Jun. 17, 1996 [CH] Switzerland ............................ 1512/96

[51] Int. Cl.⁷ ..................................................... B23Q 3/00
[52] U.S. Cl. ............................................. 269/309; 269/58
[58] Field of Search ............................ 269/309, 58, 310, 269/81, 82, 83, 84, 85, 63

[56] References Cited

U.S. PATENT DOCUMENTS

4,534,546   8/1985   Cattani ..................................... 269/309

*Primary Examiner*—David A. Scherbel
*Assistant Examiner*—Benjamin M. Halpern
*Attorney, Agent, or Firm*—Tarolli, Sundheim, Covell, Tummino & Szabo L.L.P.

[57] ABSTRACT

A device for clamping a work piece or a tool in a well defined position comprises a first coupling element assigned to the work piece or tool to be clamped and a second, stationary coupling element. The first coupling element is provided with grooves that cooperate with aligning members provided on the second coupling element to effect a precise positioning of the first coupling element with respect to the second coupling element in X- and Y-directions. A clamping pin member required for locking the two coupling elements to each other is located on the second coupling element. To protect the parts and element essential for the fine positioning, the first coupling element is provided with a supporting member towering above the aforementioned parts and elements.

22 Claims, 5 Drawing Sheets

CLAMPING DEVICE AND CLAMPING ASSEMBLY FOR CLAMPING WORK PIECES OR TOOLS IN A WELL DEFINED POSITION

1. Field of the Invention

The present invention refers to a clamping device for clamping work pieces or tools in a well defined position. The clamping device comprises a first coupling element to be stationary mounted, e.g. on the work table of a machine tool, as well as a second clamping element that is assigned to the work piece or tool to be clamped and that can be locked to and released from the first clamping element. For the fine positioning, one of the two coupling elements is provided with grooves adapted to cooperate with positioning members provided on the other coupling element to determine thereby the mutual position of the coupling elements in X- and Y-direction. Still for the fine positioning, one of the two coupling elements is provided with elevated contact surfaces and the other one with flat surface portions on which the elevated contact surfaces rest when the two coupling elements are locked together, thereby determining the mutual position of the two coupling elements in Z-direction.

Further, the invention refers to a clamping assembly for clamping work pieces or tools in a well defined position. The clamping assembly comprises a work piece or tool carrier member, a plurality of first coupling elements connected to the work piece carrier member in spaced relationship, and a corresponding plurality of second coupling elements stationary arranged in a corresponding spaced relationship and adapted to cooperate with the plurality of first coupling elements. Thereby, the entirety of grooves and aligning members provided on the first and second coupling elements, respectively, determines the definitive position of the work piece carrier member in X-direction and in Y-direction as well as its angular orientation around the Z-direction.

2. Prior Art

The document EP 0,255,042 B1 discloses a clamping device for a tool of a machine tool. That clamping device comprises a clamping chuck and a tool carrier member for receiving the tool to be clamped. The clamping chuck is provided with post members and with strip members protruding from the lower surface thereof, whereby the strip members tower above the post members and are provided with contacting surfaces for aligning the tool. The tool carrier member comprises a flat surface which is intended to rest against the aforementioned post members and into which grooves are cut which are intended to be engaged by the strip members. The grooves are provided with elastic lips intended for resting against the strip members. For clamping the tool carrier member to the clamping chuck, the carrier member is provided with a clamping pin member.

In order to ensure that such a tool carrier member equipped with a tool can be safely placed on a work bench outside the machine tool, and in order to avoid any damage to the clamping pin member and to the tool, the clamping pin member has to be removed from the tool carrier member before the tool carrier member can be put aside. Particularly, after the clamping pin member having been removed, the tool carrier member can be put upside down on a work bench, i.e. it will rest on its flat surface. However, this involves the danger that the elastic lips are mechanically damaged and/or that the grooves in the flat surface are contaminated. The same danger also exists when the tool carrier member is put on a work bench with one of its lateral surfaces downwards, whereby it doesn't matter whether or not the clamping pin member is removed. It is understood that such a clamping device, particularly its tool carrier member, must be handled with utmost care. Moreover, the clamping device of EP 0,255,042 B1 cannot be used with big and/or heavy work pieces, because tool carrier members provided with big and heavy tools cannot be handled with the same care as small and light carrier members, as experience has shown.

OBJECTS OF THE INVENTION

It is therefore an object of the present invention to provide a clamping device and a clamping assembly for clamping work pieces or tools in a well defined position, which does not show the aforementioned disadvantages.

Particularly, it is an object of the present invention to provide a clamping device and a clamping assembly for clamping work pieces or tools in a well defined position which is much more sturdy than the clamping devices known in the prior art.

It is a further object of the present invention to provide a clamping device and a clamping assembly for clamping work pieces or tools in a well defined position which is largely insensitive to rough handling.

It is a further object of the present invention to provide a clamping device and a clamping assembly for clamping work pieces or tools in a well defined position by means of which even very large and heavy work pieces or tools can be handled.

SUMMARY OF THE INVENTION

In order to meet these and other objects, the present invention provides, according to a first aspect, a device for clamping a work piece or a tool in a well defined position comprising a first coupling element adapted to be stationary mounted, e.g. on the work table of a machine tool, and a second coupling element assigned to the work piece or tool and adapted to be fixed to and released from the first coupling element.

The clamping device includes first aligning means for aligning the second coupling element with respect to the first coupling element in the direction of the X-axis or in the direction of the Y-axis or in both the X- and Y-axis directions of a Cartesian co-ordinate system, and second aligning means for aligning the second coupling element with respect to the first coupling element in the direction of the Z-axis of a Cartesian co-ordinate system.

For locking the second coupling element to the first coupling element, at least one clamping pin member is located on the first stationary coupling element.

The aforementioned first aligning means comprise grooves provided on one of the first and second coupling elements, and aligning members provided on the other one of the first and second coupling elements. The aligning members engage the grooves when the second coupling element approaches the first coupling element.

The aforementioned second aligning means comprise elevated contact surfaces protruding from one of the first and second coupling elements, and a flat surface provided on the other one of the first and second coupling elements. The elevated contact surfaces and the flat surface rest on each other when the second coupling element is locked on the first coupling element. The second coupling element is equipped with a supporting member that includes a free supporting surface and towers above the alignment means provided on the second coupling element.

Due to the fact that the clamping pin member is provided on the stationary coupling element, it is ensured that the second coupling element, i.e. the coupling element assigned to the work piece or tool, doesn't comprise any far protruding portions; thus, depositing of the second coupling element e.g. on a work bench outside the machine tool is greatly facilitated and the need is removed to first disassemble the clamping pin member. The provision of a supporting member on the second coupling element, i.e. the coupling element assigned to the work piece or tool, which towers above all the parts and elements essential for the fine positioning of the coupling element and which includes a free supporting surface having no positioning or aligning function whatsoever, results in a coupling element, i.e. in a work piece or tool carrier member, which can be handled easily and which is insensitive to damage or contamination, because the relevant aligning parts or elements that are quite delicate as far as mechanical damage or contamination is concerned are protected by the supporting member. Moreover, the supporting member enables the work piece or tool carrier to be deposited safely on a work bench.

In a preferred embodiment, the supporting member has an inner surface corresponding in shape essentially to the outer contour of the second coupling element, whereby the elevated contact surfaces are provided on the first stationary coupling element, and the supporting member towers above the alignment means provided on the second coupling element by an amount which is greater than the elevation of the elevated contact surfaces. Thereby, it can be ensured that the parts and elements essential for the mutual fine positioning of the two coupling elements are protected when the two coupling elements are locked to each other. Thus, the danger of a damage or contamination of these delicate parts and elements is greatly reduced during the machining process of a work piece, e.g. during drilling, milling, turning etc.

In a further preferred embodiment, the inner surface of the supporting member is provided with a sealing member engaging the outer surface of the second coupling element when the first and second coupling elements are locked to each other. Such a clamping device is protected even against penetration of dust or water.

In order to facilitate an initial mutual alignment of the two coupling elements, means should be provided for coarsely positioning the second coupling element with respect to the first, stationary coupling element when the second coupling element approaches the first coupling element. Thus, according to a further preferred embodiment, the second coupling element which is provided with a central aperture adapted to receive the clamping pin member includes an annular insert located at the one end of the central aperture that faces the first coupling element when the first and second coupling elements are locked to each other. The clamping pin member has an end surface including a chamfered or rounded portion. Thereby, the annular insert and the chamfered or rounded portion cooperate to serve as a coarse positioning means coarsely defining the mutual position of the first and second coupling elements when the second coupling element approaches the first coupling element. Preferably, the annular insert is provided with a chamfered edge located at that aforementioned one end of the central aperture.

According to a second aspect, the invention provides a clamping assembly comprising a work piece carrier member, a plurality of first coupling elements connected to the work piece carrier member in spaced relationship, and a corresponding plurality of second coupling elements stationary arranged in a corresponding spaced relationship and adapted to cooperate with the plurality of first coupling elements.

Further provided are means for locking each of the first coupling elements to a corresponding one of the second coupling elements, including clamping pin members located on the second stationary coupling elements.

First aligning means serve for aligning the first coupling elements with respect to the second coupling elements in a plane extending parallel to the work piece carrier member, and second aligning means serve for aligning the first coupling elements with respect to the second coupling elements in a direction running perpendicular to the plane extending parallel to the work piece carrier means.

The first aligning means comprise grooves provided on the first or second coupling elements, and aligning members provided on the second or first coupling elements. The aligning members engage the grooves when the second coupling elements approach the first coupling elements.

The second aligning means comprise elevated contact surfaces protruding from the first or second coupling elements, and flat surfaces provided on the second or first coupling elements. The elevated contact surfaces and the flat surfaces rest on each other when the second coupling elements are locked to the first coupling elements.

The first coupling elements are equipped with supporting members including free supporting surfaces and towering above the alignment means provided on the first coupling elements, whereby the entirety of the grooves and the aligning members determines the definitive position of the work piece carrier member in X-direction and in Y-direction as well as its angular orientation around the Z-direction.

With the help of such an assembly, even very large and heavy work pieces which have to be displaced often by means of a crane can be transported to the machining location quickly and without effort and clamped there. After machining, the work piece carrier member can be deposited at practically any convenient location without the need to take special measures of precaution, because the work piece carrier member rests on the supporting members assigned to its coupling elements; thus, a damage or contamination of the aligning means is practically impossible.

BRIEF DESCRIPTION OF THE DRAWINGS

In the following, embodiments of the invention will be further described, with reference to the accompanying drawings, in which.

DETAILED DESCRIPTION OF PREFERRED EMBODIMENTS

For simplicity, in the following, the coupling element assigned to the work piece and the tool, respectively, is designated just by the expression "coupling element", while the expression "clamping element" shall be used for the other, stationary coupling element.

Figure 1:
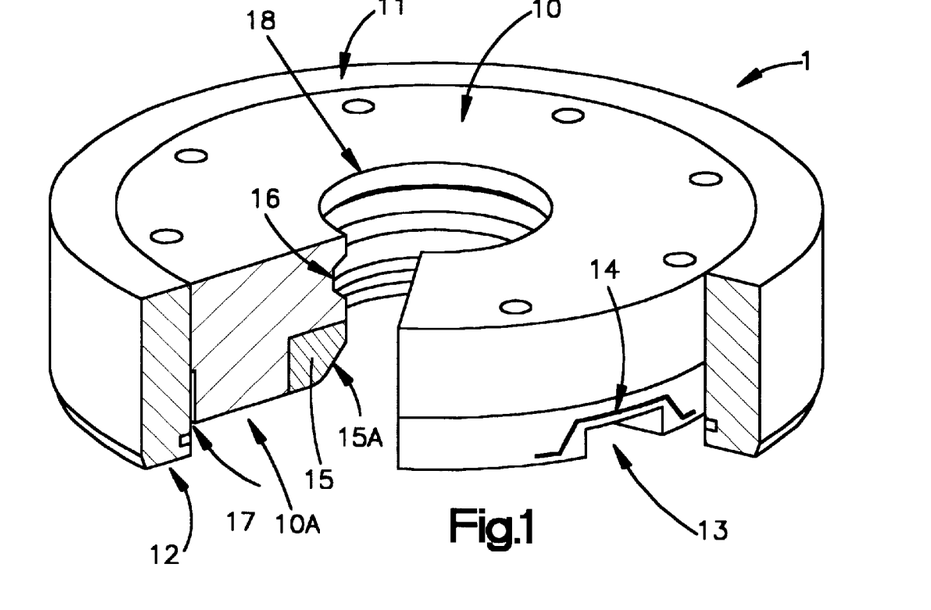
FIG. 1 shows a perspective view of a first embodiment of a coupling element assigned to the work piece and the tool, respectively.
Figure 2:
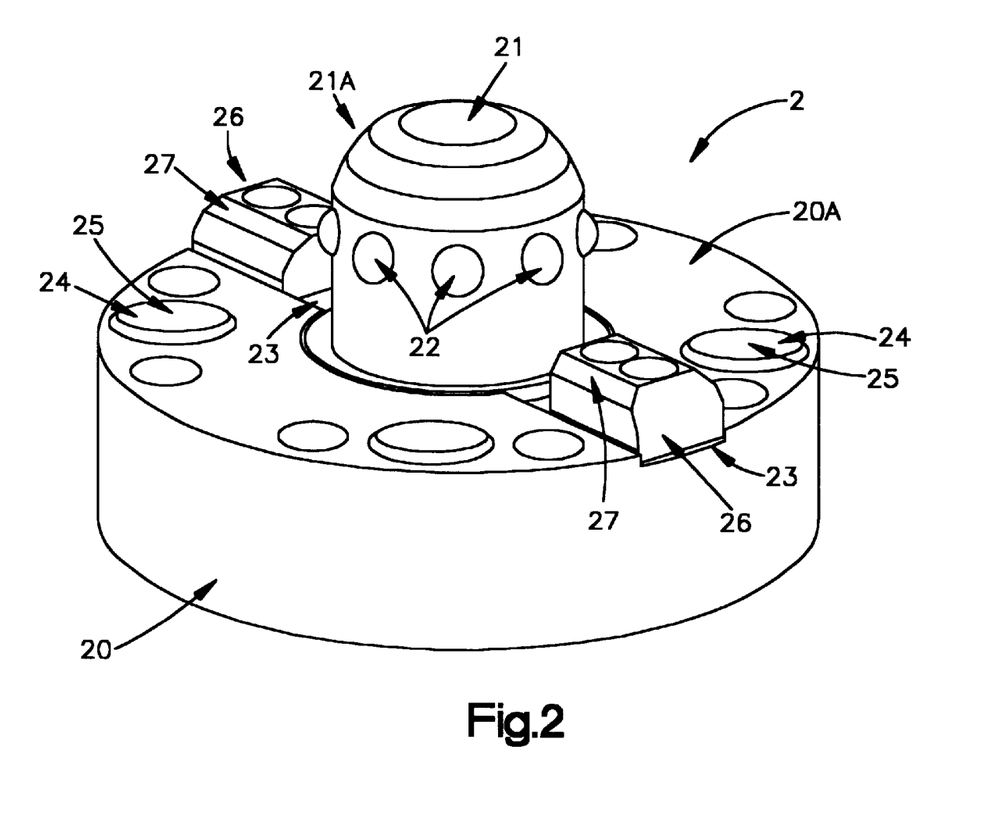
FIG. 2 shows a perspective view of a stationary coupling element.

FIG. 1 shows a perspective, partly sectional view of a first embodiment of a coupling element 1 adapted to receive a (not shown) work piece or a (not shown) tool, and FIG. 2 shows a perspective view of a first embodiment of a clamping element 2. The coupling element 1 and the clamping element 2 together form a clamping apparatus. Normally, the coupling element 1 bears a work piece to be machined or is used to hold a tool for machining a work piece, while the clamping element 2 is stationary, e.g. fixed to the worktable of a machine tool (not shown).

The coupling element 1 comprises a base body member 10 that is surrounded by a supporting member 11. The supporting member 11 towers above the lower side 10A of the base body member 10 and is provided with a lower supporting surface 12. The opposite surface at the top of the supporting member 11 is flush with the flat surface of the base body member 10.

The base body member 10 is provided with a central aperture 18, which is limited at its lower side by an annular insert 15. This annular insert 15 comprises an angular centering surface 15A. Preferably, the annular insert 15 is interchangeably fixed to the base body member 10, for example by being mounted in the base body member 10 by means of (not shown) screws. The inner wall of the aperture 18 is provided with an annular groove 16 adapted to receive the clamping balls 22 of the clamping element 2 (FIG. 2), as will be further explained hereinafter. The generally flat lower surface 10A of the base body member 10 is provided with recesses in the shape of grooves 13, adapted to cooperate with aligning members 26 provided on the clamping element 2 (FIG. 2), as will be further explained hereinafter.

Depending on whether the coupling element 1 is used as an autonomous work piece carrier or as a portion of a work piece fixing and clamping assembly, there are provided either four eccentric and angularly offset grooves 13 or, as shown in FIG. 1 of the drawings, two juxtaposed grooves 13. Behind each groove 13, there is provided a cutting or narrow window 14 whose function will be explained in more detail hereinafter.

The lower portion 10A of the base body member 10 is provided with a circumferential recess 17, separating that lower portion from the supporting member 11 and, thus, allowing for a unhindered displacement of the bottoms of the grooves 13 when they are engaged by the aligning members 26 of the clamping element 2.

The grooves 13, together with the flat, smooth lower surface 10A of the base body member, are the parts of the coupling element 1 essential for the fine positioning of the coupling element 1 with respect to the clamping element 2, while the aforementioned annular insert 15 is provided for an initial coarse positioning of the coupling element 1 with respect to the clamping element 2. The parts 10A, 13 essential for the fine positioning are protected against damage by means of the supporting member 11 towering above the surface 10A of the base body member 10.

The clamping element 2 comprises a base body member 20 to which is connected a clamping pin 21. The free end surface 21A of the clamping pin 21 serves as a centering surface by being of chamfered or rounded design and by extending over at least one third of the cross sectional area of the clamping pin 21. Four contacting surfaces 24 and two aligning members 26 tower above the flat upper surface 20A of the base body member 20 of the clamping element 2. It is understood that only three of the four contacting surfaces 24 are visible in FIG. 2. In the centers of the contacting surfaces 24, bores 25 are provided. Pressurized air can escape from these bores 25 to clean the contacting surfaces 24 immediately before they touch the flat surface 10A of the coupling element 1 during the clamping operation.

The aligning members 26 can be fixed to grooves 23 provided in the base body member 20 and secured by means of screws (not shown). The upper longitudinal edges of the aligning members 26 are chamfered to thereby form aligning surfaces 27 cooperating with the upper sharp edges of the grooves 13 provided in the surface 10A of the base body member 10 of the coupling element 1. The aligning members 26, together with contacting surfaces 24 of the base body member 20, are the parts of the clamping element 2 essential for the fine positioning of the clamping element 2 with respect to the coupling element 1, while the aforementioned free end surface 21A of the clamping pin 21 is provided for an initial coarse positioning of the clamping element 2 with respect to the coupling element 1. For mutually fixing the coupling element 1 and the clamping element 2, clamping pin 21 of the latter one is provided with a plurality of clamping balls 22 which engage the afore mentioned groove 16 provided in the inner wall of the aperture 18 of the coupling element 1 (FIG. 1) during the clamping operation.

Figure 3:
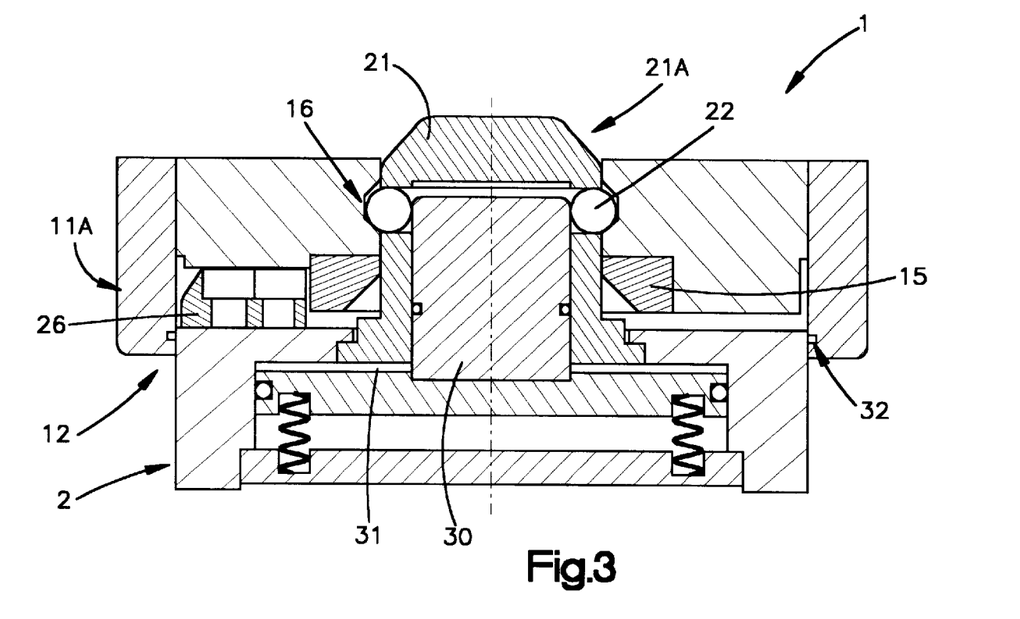
FIG. 3 shows a cross sectional view of a clamping apparatus comprising the two coupling elements of FIG. 1 and FIG. 2.

FIG. 3 shows a schematic cross sectional view of the coupling element 1 and the clamping element 2 during the clamping operation. The jointing of the two elements 1 and 2 is facilitated by the cooperation of the coarse positioning means, i.e. the annular insert 15 of the coupling element 1 and the chamfered or rounded end surface 21A of the clamping pin 21 of the clamping element 2. Preferably, the annular insert 15 is made of a material that is softer than the material of which the clamping pin 21 consists; thus, any damage to the clamping pin 21 is avoided during the mutual coarse alignment of the coupling element 1 and the clamping element 2. For example, the annular insert 15 may be made of brass or bronze; however, even a suitable plastic material can be used.

After the mutual coarse alignment of the coupling element 1 and the clamping element 2 having been completed, the mutual fine alignment of these two elements 1 and 2 is accomplished. As soon as the grooves 13 provided in the coupling element 1 are lined up with the aligning members 26 of the coupling element 2, the two elements 1 and 2 are moved towards each other whereby the aligning members 26 engage the grooves 13. Thus, the two elements 1 and 2 are aligned with each other essentially without any incurred forces. Thereby, the mutual positioning of the two elements 1 and 2 with respect to the X- and Y-directions as well as with respect to their angular position is completed.

Now, the real clamping of the coupling element 1 to the clamping element 2 is accomplished. Thereby, the clamping balls 22 engage the groove 16 provided in the inner wall of the central aperture 18 of the coupling element 1. As can be seen in FIG. 3, the interior of the hollow clamping pin 21 is provided with a movable piston 30 biased upwards, i.e. towards the free end surface 21A of the clamping pin 21, by means of a spring assembly. Thereby, the clamping balls 22 are forced radially outwards. The piston 30 can be moved downwards, opposite to the force exerted by the spring assembly, with the result that the clamping balls 22 are released so that the two elements 1 and 2 can be separated from each other. In the rest position shown in FIG. 3, the piston 30 is stationary in its upper position and forces the clamping balls 22 into the groove 16, whereby the two elements 1 and 2 are interlocked with respect to each other. In order to displace the piston 30 downwards, and thereby to release the clamping balls 22, a pressure chamber 31 is filled with pressurized air. It is understood that it would be possible to design the clamping element 2 such that the piston could be displaced upwards under the influence of pressurized air. This could be accomplished additionally to the force exerted by the spring assembly, or instead of the spring force. In a similar manner, it is also possible to pneumatically clamp and interlock the two elements 1 and 2.

In order to align the coupling element 1 with respect to the clamping element 2 in a defined position in Z-direction, the coupling element 1 is displaced during the real clamping operation contrary to the spring force exerted by the resilient elements constituted by the grooves 13 provided with the cutting or narrow window 14 to such an extent until the flat smooth lower surface 10A of the coupling element 1 abuts against the contact surfaces 24 of the clamping element 2 (FIGS. 1 and 2).

Due to the fact that the supporting member 11 towers above the elements 10A, 13 and 14 essential for the fine positioning of the coupling element 1 with respect to the clamping element 2 by an amount which is greater than the amount of the elevation of the contact surfaces 24, the upper side of the clamping element 2 is enclosed by the supporting member 11 once the two elements 1, 2 are connected to each other. Additionally, the inner wall of the supporting member 11 is provided with a circumferential groove receiving a sealing ring member 32; thus, the coupling element 1 being fixed to the clamping element 2, all parts and elements 10A, 13, 14, 21, 22, 24, 26 essential for a reliable centering and clamping are reliably protected against dirt and dust.

Instead of providing a circumferential groove receiving a sealing ring member 32 at the inner wall of the supporting member 11, as shown in FIG. 3, it could be wise to provide the lower end of the supporting member with a chamfered inner edge which has a circumferential groove extending under a certain angle with respect to the contact surfaces and receiving a sealing ring. In that case, the clamping element preferably comprises a circumferential edge portion suitably located in a region where that sealing ring can contact it once the two elements have been interlocked. By such a design, the reaction forces exerted by the sealing ring on the coupling element can be kept low such that the sealing ring does not significantly influence the mutual alignment of the two elements.

Figure 4:
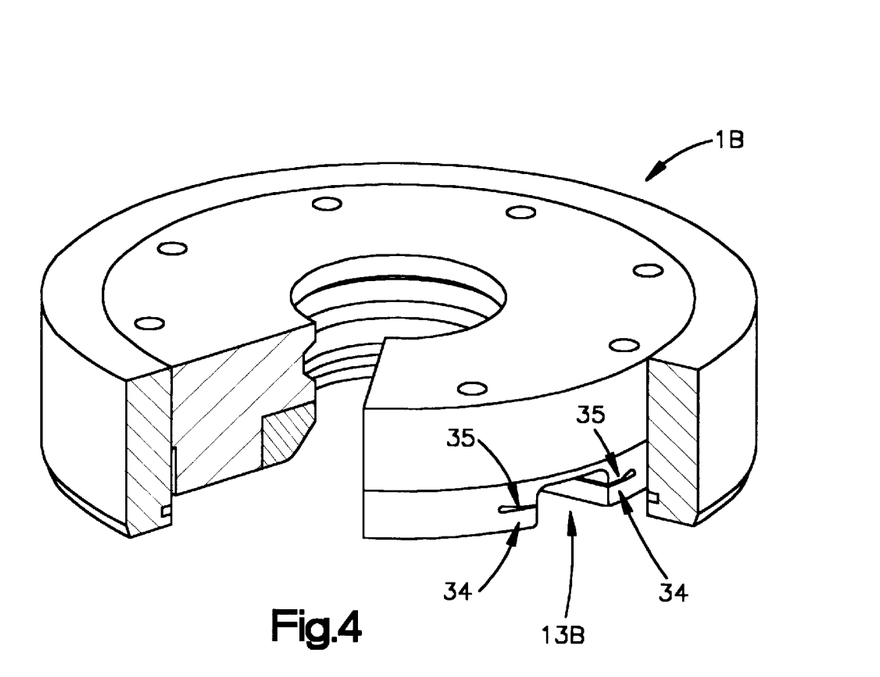
FIG. 4 shows a perspective view of a second embodiment of a coupling element assigned to the work piece and the tool, respectively.

FIG. 4 illustrates a second embodiment of a coupling element 1B in a perspective partly sectional view similar to the one shown in FIG. 1. Instead of a narrow window or cutting 14 located behind the groove 13, as in the first embodiment according to FIG. 1, the coupling element 1B comprises two resilient lip members 34 assigned to each groove 13B, the lip members 34 being formed by the provision of cuttings 35 running parallel to the flat lower surface of the coupling element 1B. Such a design with resilient lip members 34 produce the same effect as a groove having a narrow window or cutting therebehind as shown in FIG. 1, i.e. when the coupling element 1B approaches the clamping element 2, the chamfered aligning surfaces 27 of the aligning members 26 engage the edges of the lip members 34 and, after the real aligning operation, resiliently deform them when the two elements 1B, 2 are clamped to each other until the contact surfaces 24 of the clamping element 2 abut against the lower flat surface of the coupling element 1B.

Figure 5:
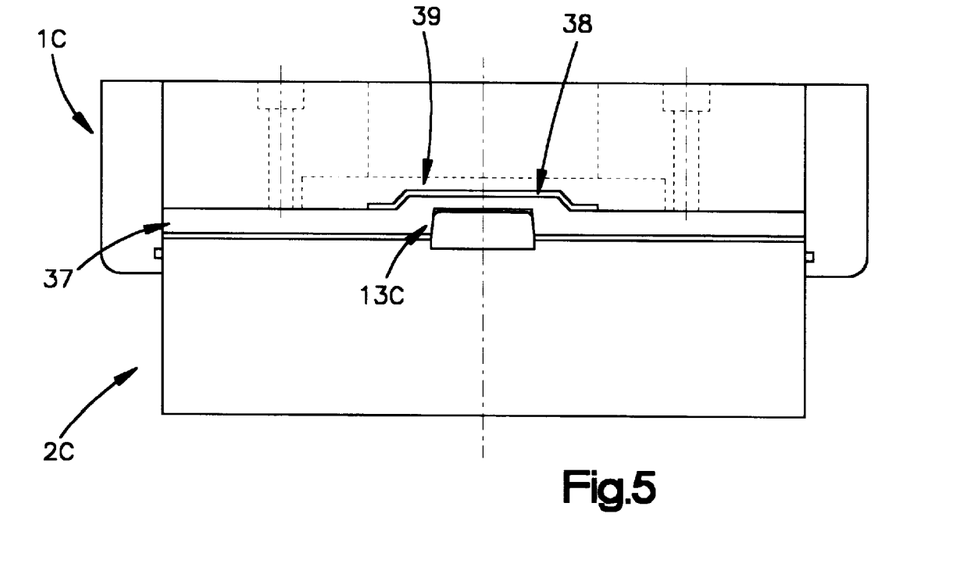
FIG. 5 shows a schematic side view of a further embodiment of a clamping apparatus.

FIG. 5 shows a schematic partial side view of another embodiment of a coupling element 1C provided with a resilient disc member 37. The clamping element 2C of FIG. 5 essentially corresponds to the one shown in FIG. 2 and described in connection therewith. The resilient disc member is mounted to the lower surface of the coupling element 1C and replaces the arrangement with the grooves 13 provided with narrow windows or cuttings 14 of the embodiment according to FIG. 1, since the required resilience in Z-direction is ensured by the behavior of the disc member 37. The resilient disc member 37 is provided with grooves 13C. In the region of the grooves 13C, the resilient disc member 37 is reinforced. In order to allow for a deflection of the resilient disc member 37 in the region of the grooves 13C, the base body member of the coupling element 1C is provided with a recess 39 located in the region of the grooves 13C and having a depth which is somewhat larger than the elevation of the resilient disc member 37 caused by the provision of the reinforced portion in the region of the grooves 13C. Thus, there is a gap 38 between the resilient disc member 37 and the recess 39, which allows a certain deflection of the resilient disc member 37 in Z-direction. It should be mentioned here that it is possible to replace the grooves 13C provided in the disc member 37 and shown in the embodiment according to FIG. 5 by apertures whose edges can be engaged by the aligning members 26 of the clamping element 2 (FIG. 2).

Figure 6:
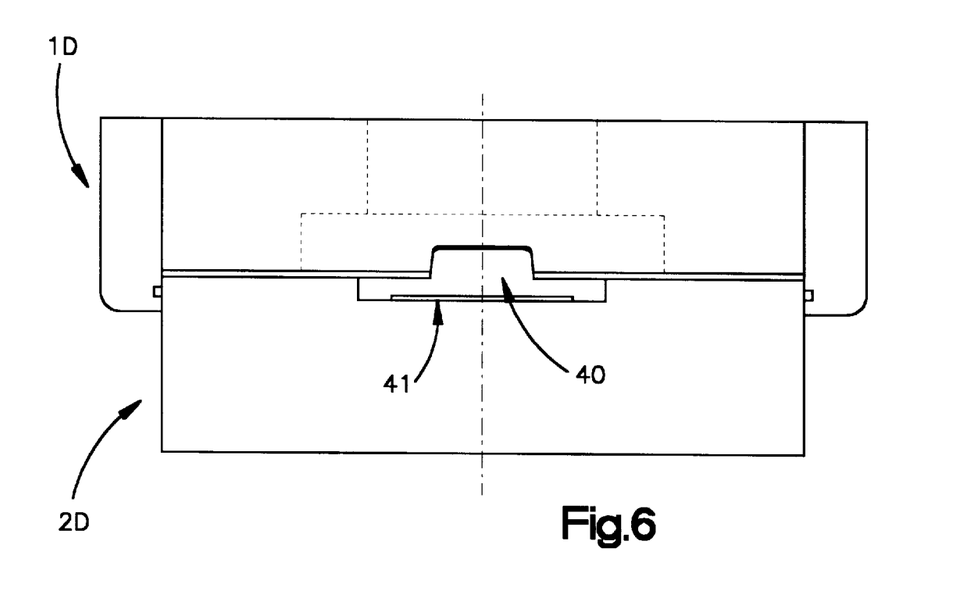
FIG. 6 shows a schematic side view of a still further embodiment of a clamping apparatus.

FIG. 6 shows a schematic partial side view of another embodiment of a clamping element 2D. Thereby, the coupling element 1D cooperating with the clamping element 2D does not have resilient grooves 13 (FIG. 1) nor a resilient disc member 37 (FIG. 5), but a rigid groove. However, in that embodiment, the clamping element 2D is provided with aligning members 40 who can be resiliently displaced in Z-direction. For this purpose, a recess 41 is provided behind each of the aligning members 40. It is understood that instead of providing a recess 41 behind each of the aligning members 40, the latter ones could be resiliently supported, e.g. on a resilient disc member (not shown). In the case of the provision of aligning members 40 resiliently displaceable in Z-direction, the corresponding grooves in the coupling element corresponding therewith can be rigid or located in a rigid portion of the coupling element 1D.

Figure 7:
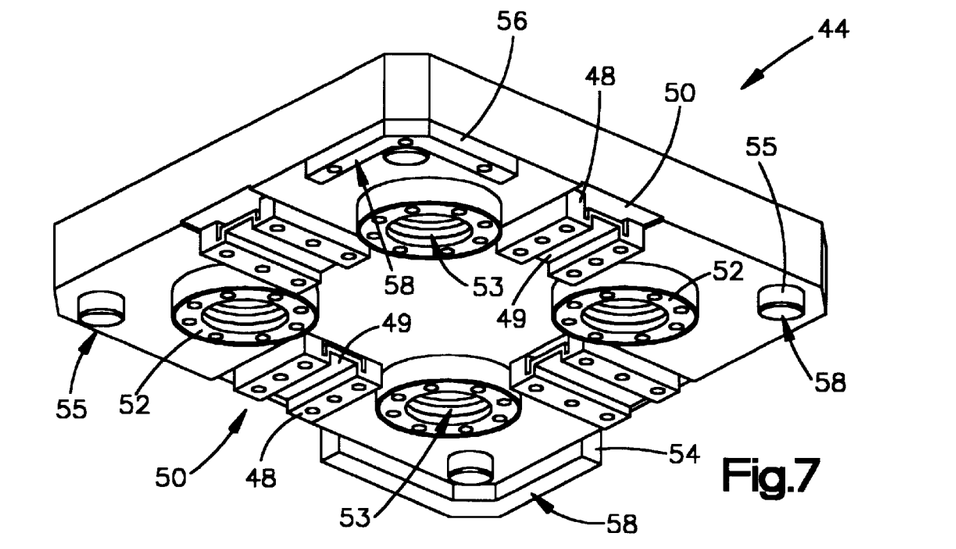
FIG. 7 shows a perspective view of a third embodiment of a coupling element assigned to the work piece and the tool, respectively.
Figure 8:
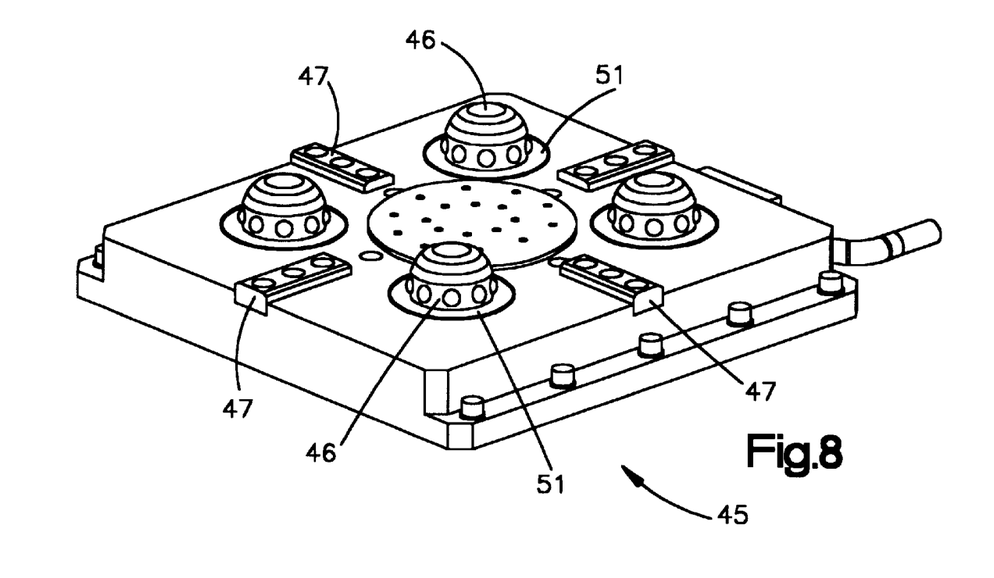
FIG. 8 shows a perspective view of a further embodiment of a stationary coupling element adapted to cooperate with the coupling element of FIG. 7.

FIGS. 7 and 8 show a perspective view of still another embodiment of a device for clamping work pieces in a well defined position, comprising a coupling element 44 to which a work piece or a tool blank to be machined can be fixed (FIG. 7) as well as a stationary clamping element 45 (FIG. 8). The device for clamping work pieces in a well defined position shown in those figures is particularly suitable for large and/or heave work pieces or tool blanks. In order to provide for a high and evenly effective clamping force, the stationary clamping element 45 comprises four clamping pin members 46 which are surrounded in each case by a contact surface 51. These contact surfaces 51 have an elevation of a few millimeters with respect to the surface of the clamping element 45. Between each two clamping pin members 46, in each case an aligning member 47 is provided. Each of the four aligning members 47 shown in FIG. 8 is received in a recess provided in the flat upper surface of the clamping element 45.

The coupling element 44 shown in FIG. 7 comprises four annular contact surfaces 52. In the centers of these contact surfaces 52, in each case a bore 53 is provided, corresponding in size and location with the alignment members 47 of the clamping element 45. The grooves 49 required for the fine positioning of the coupling element 44 with respect to the clamping element 45 are machined in discrete spring members 48 that are inserted into recesses 50 provided in the surface of the coupling element 44 (FIG. 7). Such spring members 48 are able to take quite large lateral forces.

By virtue of the arrangement of the fine positioning elements shown in FIGS. 7 and 8, i.e. spring members 48 with grooves 49 as well as aligning members 47, the final position of the coupling element 44 with respect to the clamping element 45 is exactly set both in x- and Y-direction as well as with respect to the angular position around the central Z-axis.

The illustration of the embodiment of a coupling element 44 according to FIG. 7 incorporates three different variants of supporting members, to be used alternatively and not in combination.

In a first variant, the coupling element 44 is provided with a circumferential strip member 54. The shape of this strip member 54 corresponds to the outside contour of the clamping element 45 with the result that the clamping element 45 is surrounded by the strip member 45 once the two elements 44 and 45 have been clamped together. Even if only one strip member 54 is shown in FIG. 7 which extends around one corner of the coupling element 44, it is understood that, in practice, four such strip members 54, extending around each corner of the coupling element 44, or a continuous strip member extending along the entire periphery of the coupling element 44 would be provided. Anyhow, the height of the strip member 54 and the strip members, respectively, is chosen such that it towers above the parts and elements 48, 49, 52 essential for the fine positioning by an amount that is greater than the elevation of the contact surfaces 51 of the clamping element 45.

In a second variant, the coupling element 44 is provided with a strip member 56 located at the lower surface of the coupling element 44 and running along the edge thereof. Again, even if only one strip member 56 is shown in FIG. 7 which extends along one corner of the coupling element 44, it is understood that, in practice, four such strip members 56, extending along each corner of the coupling element 44, or a continuous strip member extending along the entire periphery of the coupling element 44 would be provided. In that case, the height of the strip member 56 and strip members 56, respectively, must be chosen such that it towers above the parts and elements 48, 49, 52 essential for the fine positioning by an amount which is less than the elevation of the contact surfaces 51 of the clamping element 45. Thereby, it is ensured that the contact surfaces 51 reliable and definitely abut against the contact surfaces 52 of the coupling element 44.

In a third variant, the coupling element 44 is provided with four post members 55 located in the region of the four corners of the coupling element 44. Also in that case, the height of the post members must be chosen such that they tower above the parts and elements 48, 49, 52 essential for the fine positioning by an amount which is less than the elevation of the contact surfaces 51 of the clamping element 45. Thereby again, it is ensured that the contact surfaces 51 reliable and definitely abut against the contact surfaces 52 of the coupling element 44.

Instead of the four clamping pin members 46 shown in FIG. 8, an even higher number of clamping pin members, e.g. six of them, can be provided. Moreover, it is possible to increase the number of the aligning members 47 together with the number of the corresponding grooves 49, if required.

Figure 9:
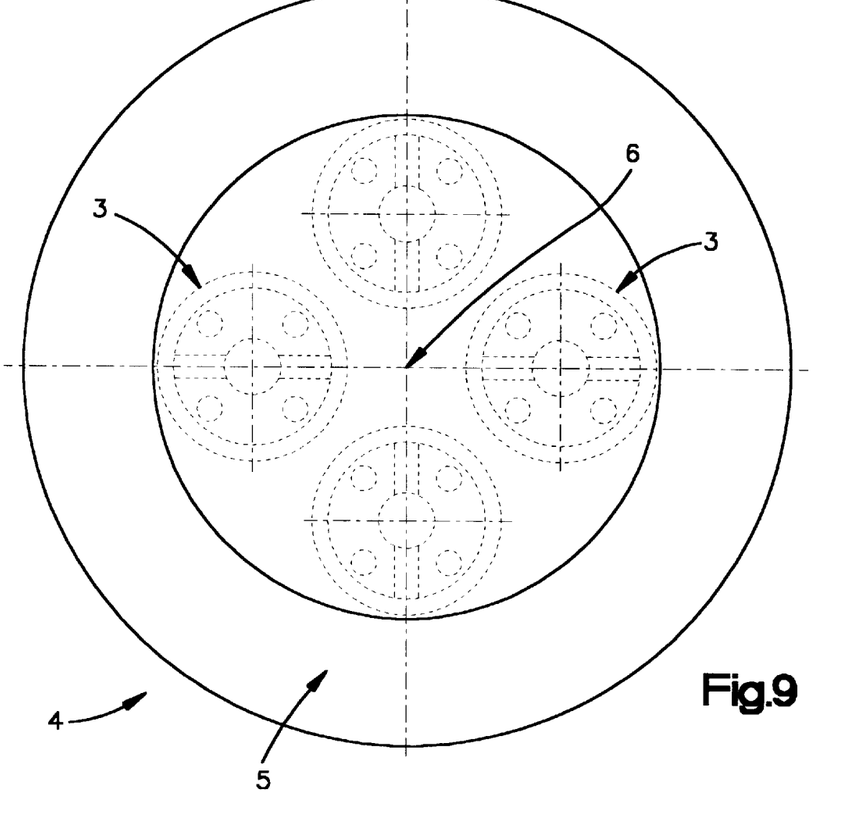
FIG. 9 shows a schematic top view of a device for clamping work pieces in a well defined position.
Figure 10:
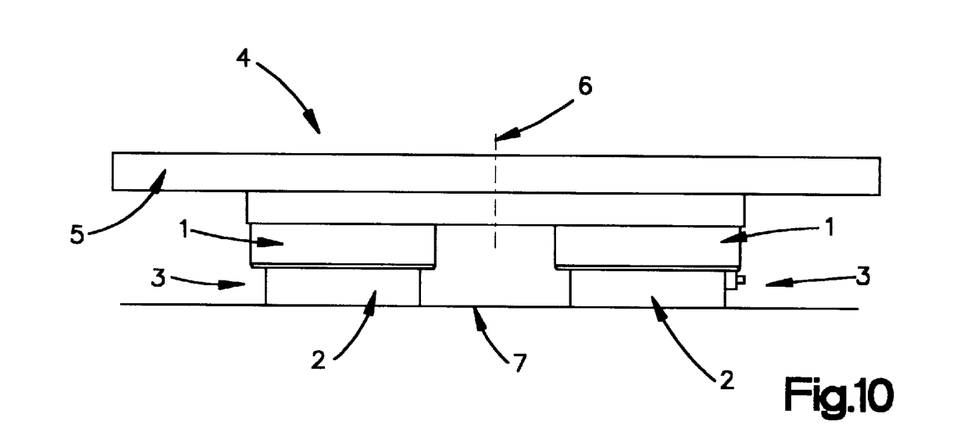
FIG. 10 shows a side view of the device shown in FIG. 9.

FIG. 9 shows a schematic top view of a device for clamping work pieces in a well defined position, and FIG. 10 shows a side view of the device shown in FIG. 9. That device comprises four clamping assemblies 3 as well as a work piece carrier 4. The work piece carrier 4 includes a circular platform member 5, and the lower surface thereof is provided with four coupling elements 1 in a symmetric arrangement around the central axis 6 of the platform member 5. To the top of the platform member 5, a work piece (not shown) to be machined can be fixed. It is understood that instead of a platform, an arbitrary other work piece carrier, e.g. a clamping frame member, could be provided.

The four clamping elements 2 of the clamping assemblies 3 are stationary mounted, e.g. on the top of the work table 7 of a machine tool. Each of the four clamping assemblies 3 is provided with two aligning members and two correspondingly located grooves. The entirety of the of those aligning means set the definitive position of the work piece carrier 4 both in X-/Y-direction and with regard to the angular orientation around the Z-axis, i.e. the central axis 6.

Instead of the circular work piece carrier 4 shown in FIGS. 9 and 10, it is possible to make use of differently shaped work piece carriers, e.g. rectangular ones. Especially in the case of rectangular work piece carriers, it is wise to provide one of the clamping assemblies 3 with four aligning members and four corresponding grooves. By means of that clamping assembly, the position of the work piece carrier is determined in X- and Y-direction, whereby a reference for the Z-axis is set. Additionally, in a first approach, also the angular orientation of the work piece carrier is determined. However, particularly in the case of large work piece carriers, it is required to more precisely define the angular orientation. Thus, at least one additional clamping assembly must be provided that is located in a certain distance from said first clamping assembly. That at least one additional clamping assembly determines only the angular orientation of the work piece carrier around the Z-axis defined by the above mentioned first clamping assembly. Thus, the additional clamping assembly comprises but two aligning members and two grooves cooperating therewith. In this way, variations in longitudinal dimensions of the work piece carrier do not have a detrimental influence on the precision of the positioning. Particularly, a thermal expansion of the work piece carrier, accompanied by a variation of the distance between the first and the additional clamping assemblies, doesn't have any negative influence on the positional accuracy of the work piece received by the work piece carrier.

It is understood that the device for clamping work pieces according to FIGS. 9 and 10 can be provided with clamping assemblies shown in and discussed in connection with FIGS. 7 and 8 instead of the above explained clamping assemblies.

One advantage of providing a work piece carrier with clamping assemblies designed according to the present invention may be seen in the fact that such a work piece carrier is very strong and sturdy as well as insensitive to rough handling. If such a work piece carrier is put onto a support of any kind, e.g. a work bench or the like, the parts and elements of the coupling elements essential for the aligning of the work piece carrier are protected against damage because the supporting members tower above that parts and elements of the coupling elements essential for the aligning of the work piece carrier; thus, only the exposed supporting surface of the supporting members are in contact with e.g. the work bench.

What is claimed is:

1. A device for clamping a work piece or a tool in a well defined position, comprising:
    a first coupling element (2) adapted to be stationary mounted;
    a second coupling element (1) assigned to the work piece or tool and adapted to be fixed to and released from said first coupling element (1);
    first aligning means (10) for aligning said second coupling element (1) with respect to said first coupling element (2) in the direction of the X-axis and/or in the direction of the Y-axis of a Cartesian co-ordinate system;
    second aligning means (26) for aligning said second coupling element (1) with respect to said first coupling element (2) in the direction of the Z-axis of a Cartesian co-ordinate system;
    means for locking said second coupling element (1) on said first coupling element (2), including at least one clamping pin means (21) located on said first stationary coupling element (2);
    said first aligning means (10) comprising groove means (13) provided on one of said first and second coupling elements, and aligning member means (26) provided on the other one of said first and second coupling elements, said aligning member means (26) engaging said groove means (13) when said second coupling element (1) approaches said first coupling element (2);
    said second aligning means (26) comprising elevated contact surface means (24) protruding from one of said first and second coupling elements, and flat surface means (10A) provided on the other one of said first and second coupling elements, said contact surface means (24) and said flat surface means (10A) resting on each other when said second coupling element (1) is locked to said first coupling element (2);
    said second coupling element (1) being equipped with supporting means including a lower supporting surface (12) and a supporting member (11) towering above the alignment means (10) provided on said second coupling element (1), and
    said first and second coupling elements have essentially a cylindrical shape, said supporting means being of annular shape having an inner diameter substantially corresponding to the outer diameter of said second coupling (1) element and adapted to enclose said second coupling element (1).

2. A device for clamping a work piece or a tool in a well defined position, comprising:
    a first coupling element (2) adapted to be stationary mounted;
    a second coupling element (1) assigned to the work piece or tool and adapted to be fixed to and released from said first coupling element (2);
    first aligning means (10) for aligning said second coupling element (1) with respect to said first coupling element (2) in the direction of the X-axis and/or in the direction of the Y-axis of a Cartesian co-ordinate system;
    second aligning means (26) for aligning said second coupling element (1) with respect to said first coupling element (2) in the direction of the Z-axis of a Cartesian co-ordinate system;
    means for locking said second coupling element (1) on said first coupling element (2), including at least one clamping pin means (21) located on said first stationary coupling element (2);
    said first aligning means (10) comprising groove means (13) provided on one of said first and send coupling elements, and aligning member means (26) provided on the other one of said first and second coupling elements, said aligning member means (26) engaging said groove means (13) when said second coupling element (1) approaches said first coupling element (2);
    said second aligning means (26) comprising elevated contact surface means (24) protruding from one of said first and second coupling elements, and flat surface means (10A) provided on the other one of said first and second coupling elements, said contact surface means (24) and said flat surface means (10A) resting on each other when said second coupling element (1) is locked to said first coupling element (2);
    said second coupling element (l) being equipped with supporting means including a lower supporting surface (12) and a supporting member (11) towering above the alignment means (10) provided on said second coupling element (1), and
    said second coupling element (1) is provided with a central aperture (18) adapted to receive said clamping pin means (2) and including an annular insert means (15) located at the one end of the central aperture (18) that faces said first coupling element (2) when said first and second coupling elements are locked to each other, and in which said clamping pin means (21) has an end surface (21A) including a chamfered or rounded portion (21A), said annular insert means (15) and said chamfered or rounded portion (21A) cooperating to serve as a coarse positioning means coarsely defining the mutual position of said first and second coupling elements when said second coupling element (1) approaches said first coupling element (2).

3. A device for clamping a work piece or a tool in a well defined position, comprising:
    a first coupling element (2) adapted to be stationary mounted;
    a second coupling element (1) assigned to the work piece or tool and adapted to be fixed to and released from said first coupling element (2);
    first aligning means (10) for aligning said second coupling element (1) with respect to said first coupling element (2) in the direction of the X-axis and/or in the direction of the Y-axis of a Cartesian co-ordinate system;
    second aligning means (26) for aligning said second coupling element (1) with respect to said first coupling element (2) in the direction of the Z-axis of a Cartesian co-ordinate system;
    means for locking said second coupling element (1) on said first coupling element (2), including at least one clamping pin means (21) located on said first stationary coupling element (2);
    said first aligning means (10) comprising groove means (13) provided on one of said first and second coupling elements, and aligning member means (26) provided on the other one of said first and second coupling elements, said aligning member means (26) engaging said groove means (13) when said second coupling element (1) approaches said first coupling element (2);
    said second aligning means (26) comprising elevated contact surface means (24) protruding from one of said first and second coupling elements, and flat surface means (10A) provided on the other one of said first and second coupling elements, said contact surface means (24) and said flat surface means (10A) resting on each other when said second coupling element (1) is locked to said first coupling element (2);

said second coupling element (1) being equipped with supporting means including a lower supporting surface (12) and a supporting member (11) towering above the alignment means (10) provided on said second coupling element (1), and said groove means (13) are provided on said second coupling element (1) and said aligning member means (26) are provided on said first coupling element (2), and in which said second coupling element (1) is provided with cuttings (14) located either behind or laterally or both behind and laterally of said groove means (13), thus enabling said groove means (13) to be resiliently displaced in the direction of the Z-axis, such that said aligning member means (26) engaging said groove means (13) have to overcome a spring force when said second coupling element (1) approaches said first coupling element (2) and such that said groove means (13) are displaced in the direction of the Z-axis when said contact surface means (24) on one of said coupling elements abut against said flat surface means (24) on the other one of said coupling elements.

4. A device for clamping a work piece or a tool in a well defined position, comprising:

a first coupling element (2) adapted to be stationary mounted;

a second coupling element (1) assigned to the work piece or tool and adapted to be fixed to and released from said first coupling element (2);

first aligning means (10) for aligning said second coupling element (1) with respect to said first coupling element (2) in the direction of the X-axis and/or in the direction of the Y-axis of a Cartesian co-ordinate system;

second aligning means (26) for aligning said second coupling element (1) with respect to said first coupling element (2) in the direction of the Z-axis of a Cartesian co-ordinate system;

means for locking said second coupling element (1) on said first coupling element (2), including at least one clamping pin means (21) located on said first stationary coupling element (2);

said first aligning means (10) comprising groove means (13) provided on one of said first and send coupling elements, and aligning member means (26) provided on the other one of said first and second coupling elements, said aligning member means (26) engaging said groove means (13) when said second coupling element (1) approaches said first coupling element (2);

said second aligning means (26) comprising elevated contact surface means (24) protruding from one of said first and second coupling elements, and flat surface means (10A) provided on the other one of said first and second coupling elements, said contact surface means (24) and said flat surface means (10A) resting on each other when said second coupling element (1) is locked to said first coupling element (2);

said second coupling element (1) being equipped with supporting means including a lower supporting surface (12) and a supporting member (11) towering above the alignment means (10) provided on said second coupling element (1), and said clamping pin means (21) comprises a plurality of clamping balls (22) engaging a circumferential groove (16) provided in the inner wall of said central aperture (18) of said second coupling element (1) when said first and second coupling elements are locked to each other.

5. A device for clamping a work piece or a tool in a well defined position, comprising:

a first coupling element (2) adapted to be stationary mounted;

a second coupling element (1) assigned to the work piece or tool and adapted to be fixed to and released from said first coupling element (2);

first aligning means (10) for aligning said second coupling element (1) with respect to said first coupling element (2) in the direction of the X-axis and/or in the direction of the Y-axis of a Cartesian co-ordinate system;

second aligning means (26) for aligning said second coupling element (1) with respect to said first coupling element (2) in the direction of the Z-axis of a Cartesian co-ordinate system;

means for locking said second coupling element (1) on said first coupling element (2), including at least one clamping pin means (21) located on said first stationary coupling element (2);

said first aligning means (10) comprising groove means (13) provided on one of said first and second coupling elements, and aligning member means (26) provided on the other one of said first and second coupling elements, said aligning member means (26) engaging said groove means (13) when said second coupling element (1) approaches said first coupling element (2);

said second aligning means (26) comprising elevated contact surface means (24) protruding from one of said first and second coupling elements, and flat surface means (10A) provided on the other one of said first and second coupling elements, said contact surface means (24) and said flat surface means (10A) resting on each other when said second coupling element (1) is locked to said first coupling element (2); and said second coupling element (1) being equipped with supporting means including a lower supporting surface (12) and a supporting member (11) towering above the alignment means (10) provided on said second coupling element (1).

6. A device according to claim 5, in which said supporting means has an inner surface corresponding in shape essentially to the outer contour of said second coupling element (1).

7. A device according to claim 5, in which said elevated contact surface means (24) are provided on said first stationary coupling element (2), and in which said supporting means towers above the alignment means (10) provided on said second coupling element (1) by an amount which is greater than the elevation of said contact surface means (24).

8. A device according to claim 6, in which said inner surface of said supporting means is provided with a sealing means engaging the outer surface of said first coupling element (2) when said first and second coupling elements are locked to each other.

9. A device according to claim 1, in which the inner surface of said annular supporting means (11) is provided with a sealing means (32) engaging the outer surface of said first coupling element (2) when said first and second coupling elements are locked-to each other.

10. A device according to claim 2, in which said chamfered or rounded portion (21A) of said end surface of said clamping pin means (21) extends over at least one third of the cross-sectional area of said clamping pin means (21).

11. A device according to claim 5, in which said second coupling element (1) is provided with an annular groove (16) in the surface that faces said first coupling element when said first and second coupling elements are locked to each other, said annular groove (16) being located close to said supporting means.

12. A device according to claim 4, in which said clamping pin means (21) is provided with a clamping ball operating means slidably received in the interior of said clamping pin means, said clamping ball operating means being biased by a spring means into a position where it presses said clamping ball means radially outwards, and said clamping ball operating means being adapted to be pneumatically displaced against the force of said spring means to release said clamping ball means.

13. A device according to claim 2, in which said annular insert means is provided with a chamfered edge located at said one end of said central aperture, said annular insert means being exchangeably received in said central aperture and made of a material which is softer than the material of said clamping pin means.

14. A device according to claim 5, in which said groove means are provided on said second coupling element and said aligning member means are provided on said first coupling element, and in which said first coupling element is provided with cuttings located behind and/or laterally of said aligning member means, thus enabling said aligning member means to be resiliently displaced in the direction of the Z-axis, such that said aligning member means engaging said groove means have to overcome a spring force when said second coupling element approaches said first coupling element and such that said aligning member means are displaced in the direction of the Z-axis when said contact surface means on one of said coupling elements abut against said flat surface means on the other one of said coupling elements.

15. A device according to claim 5, in which there is provided a resilient disc means in which said groove means are formed.

16. A device according to claim 5, in which there is provided a resilient disc means to which said alignment member means are fixed.

17. A device according to claim 5, in which said second coupling element is provided with at least four of said clamping pin means and at least four of said aligning member means, and in which said first coupling element is provided with a number of said groove means that corresponds to the number of aligning member means, whereby the entirety of cooperating groove means and aligning member means definitely defines the position of said second coupling element with regard to said first coupling element in X-direction and in Y-direction as well as its angular orientation around the Z-axis.

18. A device according to claim 17, in which said second coupling element is provided with a supporting means in the form of a peripheral strip member, the inner contour thereof corresponding to the outer contour of said first coupling element, said peripheral strip member towering above said aligning means provided on said second coupling element by an amount that is greater than the elevation of said elevated contact surface means.

19. A device according to claim 17, in which the lower surface of said second coupling element is provided with at least one supporting member that towers above said aligning means provided on said second coupling element by an amount that is smaller than the elevation of said elevated contact surface means.

20. A device according to claim 17, in which four clamping pin means are provided, whereby one aligning member means is located between each two adjacent clamping pin means.

21. A device according to claim 17, further comprising discrete spring element means in which said groove means are formed, whereby said discrete spring element means are positively inserted into recesses provided in said second coupling element.

22. A device according to claim 17, in which said aligning member means are constituted by discrete elements that are positively inserted into recesses provided in said first coupling element.

* * * * *

UNITED STATES PATENT AND TRADEMARK OFFICE
CERTIFICATE OF CORRECTION

PATENT NO. : 6,089,557
DATED : July 18, 2000
INVENTOR(S) : Basil Obrist

It is certified that error appears in the above-indentified patent and that said Letters Patent is hereby corrected as shown below:

Column 12, line 4, change "send" to "second"

Column 12, line 26, change "(2)" to "(21)"

Column 13, line 48, change "send" to "second"

Signed and Sealed this

Twenty-second Day of May, 2001

Attest:

NICHOLAS P. GODICI

Attesting Officer     Acting Director of the United States Patent and Trademark Office